（12） United States Patent
Sakata

(10) Patent No.: US 6,211,802 B1
(45) Date of Patent: Apr. 3, 2001

(54) SEMICONDUCTOR INTEGRATED CIRCUIT FOR PERFORMING DATA TRANSFER

(75) Inventor: Tadaomi Sakata, Kanagawa (JP)

(73) Assignee: NEC Corporation, Tokyo (JP)

( * ) Notice: Subject to any disclaimer, the term of this patent is extended or adjusted under 35 U.S.C. 154(b) by 0 days.

(21) Appl. No.: 09/270,750

(22) Filed: Mar. 17, 1999

(30) Foreign Application Priority Data

Mar. 24, 1998 (JP) .................................................. 10-075483

(51) Int. Cl.$^7$ ...................................................... H03M 7/00
(52) U.S. Cl. ........................... 341/88; 341/144; 341/155; 341/108; 341/110
(58) Field of Search ............................. 341/110, 88, 155, 341/144, 108

(56) References Cited

U.S. PATENT DOCUMENTS 5,404,141 * 4/1995 Ohara ..................................... 341/110

FOREIGN PATENT DOCUMENTS

| 2-212952 | 8/1990 | (JP) . |
| 4-036834 | 2/1992 | (JP) . |
| 4-352257 | 12/1992 | (JP) . |
| 6-044141 | 2/1994 | (JP) . |
| 7-295893 | 11/1995 | (JP) . |
| 9-282234 | 10/1997 | (JP) . |

* cited by examiner

Primary Examiner—Michael Tokar
Assistant Examiner—Jean Bruner JeanGlaude
(74) Attorney, Agent, or Firm—Sughrue, Mion, Zinn, Macpeak & Seas, PLLC

(57) ABSTRACT

A semiconductor integrated circuit for performing data transfer integrated circuit includes a first circuit, a second circuit, and first and second data converters. The first circuit outputs data of a plurality of bits. The second circuit receives the data from the first circuit via a data bus. The first data converter converts the data from the first circuit by a first conversion rule and outputs the data to the data bus. The second data converter converts the data from the data bus back to original data by a second conversion rule and outputs the data to the second circuit.

11 Claims, 6 Drawing Sheets

SEMICONDUCTOR INTEGRATED CIRCUIT FOR PERFORMING DATA TRANSFER

BACKGROUND OF THE INVENTION

The present invention relates to a data transfer circuit for a semiconductor integrated circuit and, more particularly, to a data transfer circuit for a computer having a data transfer data bus line.

Conventionally, a microcomputer integrated on a semiconductor substrate reads out and executes a program from a ROM (Read Only Memory). FIG. 7 shows the arrangement of a conventional microcomputer around the ROM. In FIG. 7, binary data of a ROM 2 addressed by a program counter 1 are output parallel onto a data bus 3 and sent to an instruction decoder 4.

In the microcomputer having this arrangement, data flowing through the data bus is generally fixed to a positive or negative logic level. If data on the data bus line 3 is illicitly read out by bringing a probe or the like into contact with the data bus, a program stored in the ROM 2 can be undesirably estimated to pose a security problem.

SUMMARY OF THE INVENTION

It is an object of the present invention to provide a data transfer circuit for a semiconductor integrated circuit capable of realizing a security function with respect to an illicit data read on the data bus line.

To achieve the above object, according to the present invention, there is provided a data transfer circuit for a semiconductor integrated circuit, comprising a first circuit for outputting data of a plurality of bits, a second circuit for receiving the data from the first circuit via a data bus, first data conversion means for converting the data from the first circuit by a first conversion rule and outputting the data to the data bus, and second data conversion means for converting the data from the data bus back to original data by a second conversion rule and outputting the data to the second circuit.

DESCRIPTION OF THE PREFERRED EMBODIMENTS

The present invention will be described in detail below with reference to the accompanying drawings.

[First Embodiment]

Figure 1:
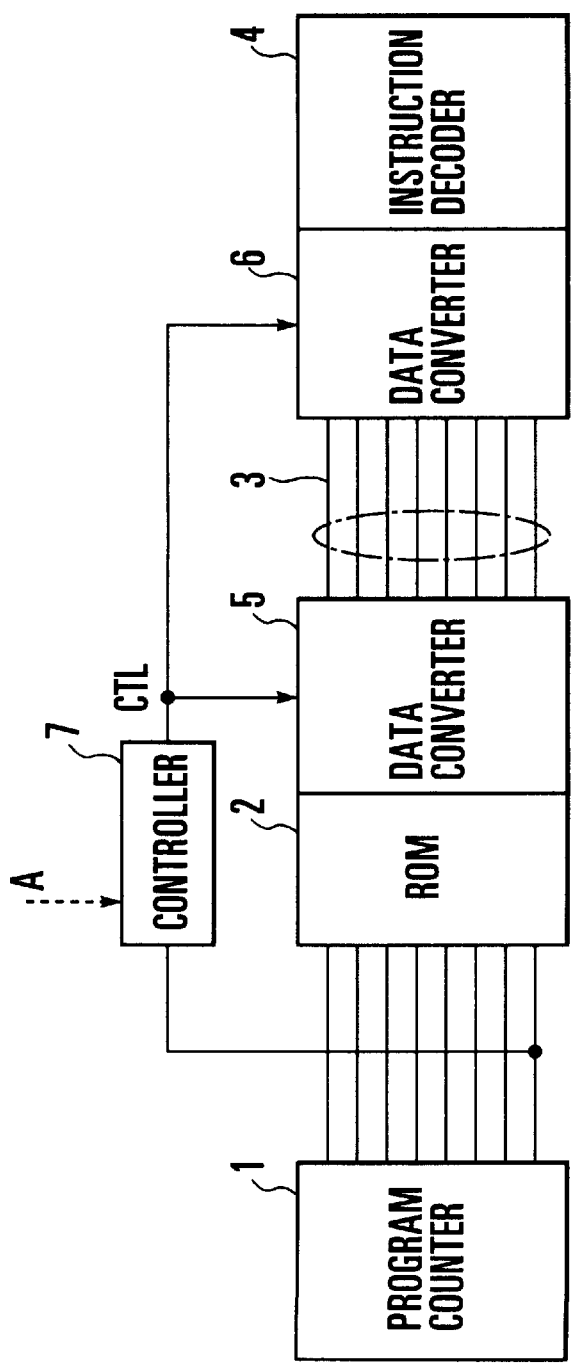
FIG. 1 is a block diagram showing the main part of a microcomputer according to the first embodiment of the present invention.

FIG. 1 shows the main part of a microcomputer according to the first embodiment of the present invention. The microcomputer of this embodiment comprises a program counter 1 which is incremented to sequentially output address data, a ROM 2 which stores in advance instruction data to be executed and is accessed using address data from the program counter 1, a data bus (instruction bus) 3 for transferring converted data of data read out from the ROM 2, an instruction decoder 4 for decoding data read out from the ROM 2, a first data converter 5 for converting data read out from the ROM 2 by a first conversion rule and outputting the converted data to the data bus 3, a second data converter 6 for converting the converted data on the data bus 3 back to the original data by a second conversion rule, and a controller 7 for outputting a control signal CTL for controlling the data converters 5 and 6.

In the computer having this arrangement, data are sequentially read out from the ROM 2, decoded, and executed. The ROM 2 outputs data of a plurality of bits parallel to the data bus 3 via the data converter 5 in accordance with an address signal output from the program counter 1. The instruction decoder 4 receives and decodes data on the data bus 3 via the data converter 6.

The data converter 5 arranged between the ROM 2 and data bus 3 converts data output from the ROM 2 and outputs the converted data to the data bus 3. The data converter 6 arranged between the data bus 3 and instruction decoder 4 converts the data on the data bus 3 back to the original data and outputs the original data to the instruction decoder 4. The controller 7 outputs the control signal CTL to the data converters 5 and 6 to control data conversion operation. Note that the data converters 5 and 6 have the same arrangement.

Figure 2:
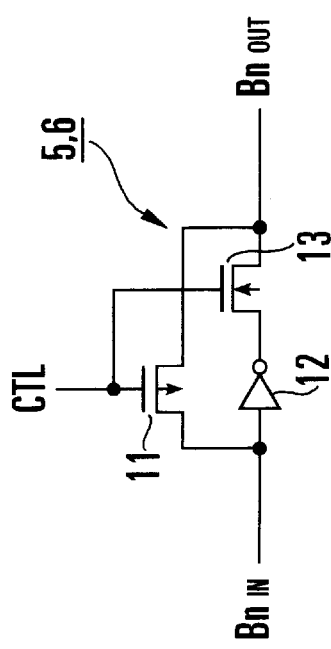
FIG. 2 is a circuit diagram showing the detailed arrangement of a data converter shown in FIG. 1.

FIG. 2 shows the arrangement of the data converters 5 and 6. Note that FIG. 2 shows 1 bit of 8-bit data output from the ROM 2. More specifically, each of the data converters 5 and 6 has an 8-bit circuit unit made up of p-channel transistors 11, inverters 12, and n-channel transistors 13 in correspondence with respective bits of data output from the ROM 2.

The drain of the p-channel transistor 11 is connected to a corresponding bit input BnIN (n is an integer of 0 to 7), the source is connected to a corresponding bit output BnOUT, and the gate receives the control signal CTL from the controller 7. The input of the inverter 12 is connected to the corresponding bit input BnIN. The drain of the n-channel transistor 13 is connected to the output of the inverter 12, the source is connected to the corresponding bit output BnOUT, and the gate receives the control signal CTL from the controller 7.

The bit input BnIN receives output data Bn from the ROM 2 in the data converter 5, and output data Bn on the data bus 3 in the data converter 6. The data converter 5 outputs data Bn from the bit output BnOUT to the data bus 3, and the data converter 6 outputs data Bn from the bit output BnOUT to the instruction decoder 4.

The controller 7 detects the least significant bit of an address signal output from the program counter 1 to the ROM 2 to determine whether the address signal is even or odd. The controller 7 sets the control signal CTL to "L" level if the detected address signal is even, and to "H" level if the detected address is odd.

An "L"-level control signal CTL turns on the transistors 11 and turns off the transistors 13 in the data converters 5 and 6. In this case, the bits B0 to B7 of 8-bit data output from the ROM 2 are output to the data bus 3 via corresponding transistors 11 of the data converter 5, then output to the instruction decoder 4 via corresponding transistors 11 of the data converter 6.

An "H"-level control signal CTL turns off the transistors 11 and turns on the transistors 13 in the data converters 5 and 6. In this case, the bits B0 to B7 of 8-bit data output from the ROM 2 are logically inverted by corresponding inverters 12 of the data converter 5, and output to the data bus 3 via corresponding transistors 13. The bits B0 to B7 of the 8-bit data are logically inverted by corresponding inverters 12 of the data converter 6, and output to the instruction decoder 4 via corresponding transistors 13.

In this manner, if an address signal output from the program counter 1 is even, data output from the ROM 2 is transferred to the instruction decoder 4 without any conversion. If an address signal is odd, data output from the ROM 2 is converted by the data converter 5, then converted back to the original data by the data converter 6, and transferred to the instruction decoder 4.

Whether to invert the logic level of data on the data bus 3 is controlled in accordance with whether an address signal output from the program counter 1 is even or odd. Even if data is illicitly read out by bringing a probe or the like into contact with the data bus 3, the readout data is different from the original data, and data stored in the ROM 2 is difficult to estimate. This can realize a security function with respect to an illicit data read on the data bus line.

[Second Embodiment]

Figure 3:
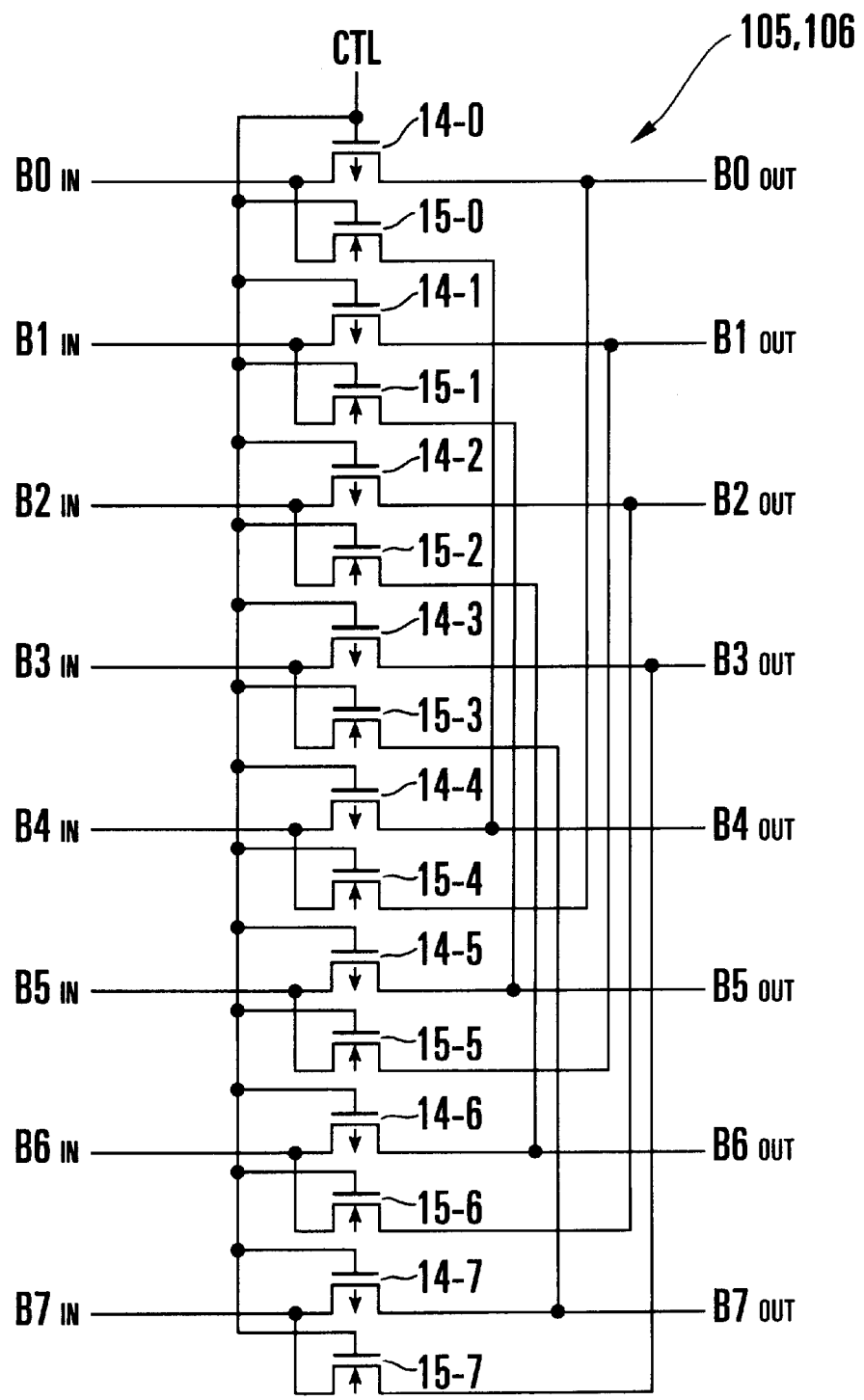
FIG. 3 is a circuit diagram showing the detailed arrangement of a data converter according to the second embodiment of the present invention.

FIG. 3 shows a data converter according to the second embodiment of the present invention. A microcomputer in the second embodiment has the same arrangement as in the first embodiment. According to the second embodiment, in the microcomputer shown in FIG. 1, data converters 105 and 106 in FIG. 3 replace the data converters 5 and 6 in FIG. 2. The data converters 105 and 106 have the same arrangement.

In FIG. 3, each of the data converters 105 and 106 comprises p- and n-channel transistors 14-0 to 14-7 and 15-0 to 15-7 arranged in correspondence with the respective bits B0 to B7 of data output from a ROM 2.

The drains of the p-channel transistors 14-0 to 14-7 are connected to corresponding bit inputs B0IN to B7IN, the sources are connected to corresponding bit outputs B0OUT to B7OUT, and the gates receive the control signal CTL. The drains of the n-channel transistors 15-0 to 15-7 are connected to the corresponding bit inputs B0IN to B7IN, and the gates receive the control signal CTL.

The sources of the n-channel transistors 15-0 to 15-3 arranged in correspondence with lower 4 bits B0 to B3 of 8-bit data are respectively connected to the sources of the p-channel transistors 14-4 to 14-7 arranged in correspondence with upper 4 bits B4 to B7 of the 8-bit data.

The sources of the n-channel transistors 15-4 to 15-7 arranged in correspondence with upper 4 bits B4 to B7 of 8-bit data are respectively connected to the sources of the p-channel transistors 14-0 to 14-3 arranged in correspondence with lower 4 bits B0 to B3 of the 8-bit data.

As in the first embodiment, a controller 7 detects whether an address signal output from a program counter 1 is even or odd, and outputs the control signal CTL in accordance with the detection result. An "L"-level control signal CTL turns on the transistors 14-0 to 14-7 and turns off the transistors 15-0 to 15-7 in the data converters 105 and 106.

In this case, the bits B0 to B7 of 8-bit data output from the ROM 2 are output to a data bus 3 via the corresponding transistors 14-0 to 14-7 of the data converter 105, and output to an instruction decoder 4 via the corresponding transistors 14-0 to 14-7 of the data converter 106.

An "H"-level control signal CTL turns off the transistors 14-0 to 14-7 and turns on the transistors 15-0 to 15-7 in the data converters 105 and 106. In this case, lower 4 bits B0 to B3 of 8-bit data output from the ROM 2 are output to upper 4 bits B4 to B7 of the data bus 3 via the transistors 15-0 to 15-3 of the data converter 105, and output as lower 4 bits B0 to B3 to the instruction decoder 4 via the transistors 15-4 to 15-7 of the data converter 106.

Upper 4 bits B4 to B7 of the 8-bit data output from the ROM 2 are output to lower 4 bits B0 to B3 of the data bus 3 via the transistors 15-4 to 15-7 of the data converter 105, and output as upper 4 bits B4 to B7 to the instruction decoder 4 via the transistors 15-0 to 15-3 of the data converter 106.

As described above, if an address signal output from the program counter 1 is even, data output from the ROM 2 is transferred to the instruction decoder 4 without any conversion. If an address signal is odd, upper 4 bits and lower 4 bits of data output from the ROM 2 are exchanged by the data converter 105, the upper 4 bits and lower 4 bits are exchanged again by the data converter 106, and the resultant data is transferred to the instruction decoder 4. The same effects as in the first embodiment can therefore be obtained.

[Third Embodiment]

Figure 4:
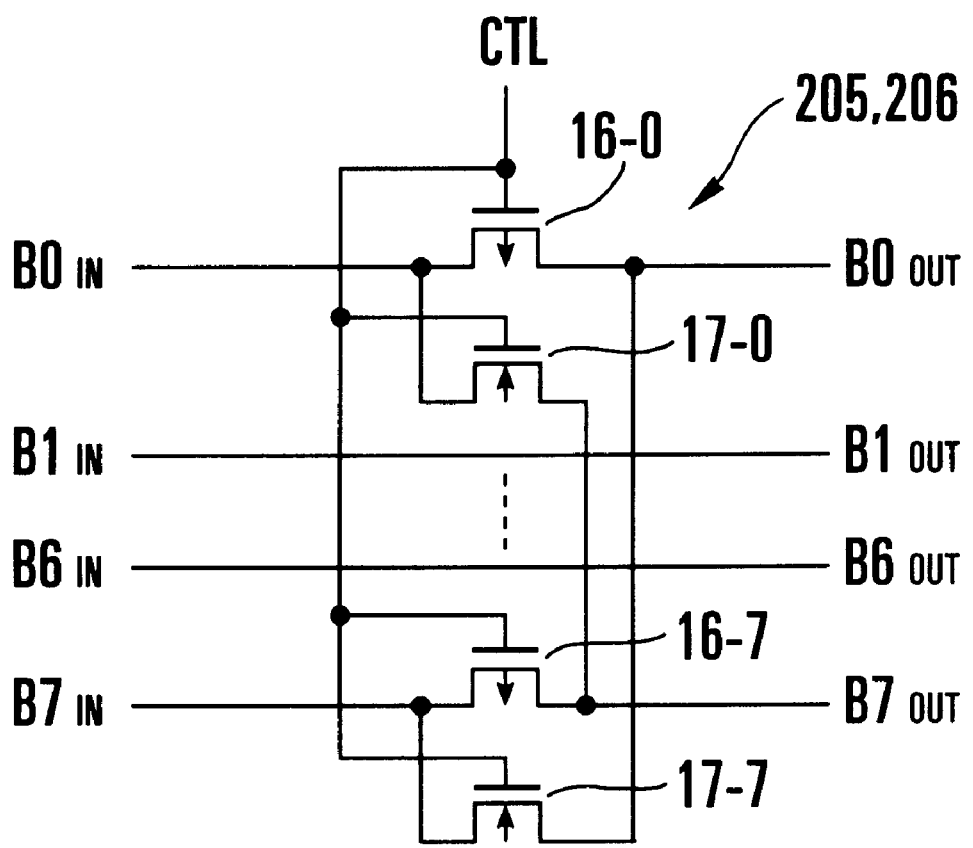
FIG. 4 is a circuit diagram showing the detailed arrangement of a data converter according to the third embodiment of the present invention.

FIG. 4 shows a data converter according to the third embodiment of the present invention. A microcomputer in the third embodiment has the same arrangement as in the first embodiment. In the third embodiment, data converters 205 and 206 in FIG. 4 replace the data converters 5 and 6 in FIG. 1. The data converters 205 and 206 have the same arrangement.

In FIG. 4, each of the data converters 205 and 206 comprises p- and n-channel transistors 16-0 and 17-0 arranged in correspondence with the least significant bit B0 of data output from a ROM 2, and p- and n-channel transistors 16-7 and 17-7 arranged in correspondence with the most significant bit B7 of the data.

The drains of the p-channel transistors 16-0 and 16-7 are connected to corresponding bit inputs B0IN and B7IN, the sources are connected to corresponding bit outputs B0OUT and B7OUT, and the gates receive the control signal CTL.

The drains of the n-channel transistors 17-0 and 17-7 are connected to the corresponding bit inputs B0IN and B7IN, and the gates receive the control signal CTL. The source of the n-channel transistor 17-0 is connected to the source of the p-channel transistor 16-7, and the source of the n-channel transistor 17-7 is connected to the source of the p-channel transistor 16-0.

Bit inputs B1IN, B2IN, B3IN, B4IN, B5IN, and B6IN are directly connected to bit outputs B1OUT, B2OUT, B3OUT, B4OUT, B5OUT, and B6OUT, respectively.

An "L"-level control signal CTL turns on the transistors 16-0 and 16-7 and turns off the transistors 17-0 and 17-7 in the data converters 205 and 206. In this case, the bits B0 and B7 of 8-bit data output from the ROM 2 are output to the bits B0 and B7 of an instruction data bus 3 via the transistors 16-0 and 16-7 of the data converter 205, and output as bits B0 and B7 to an instruction decoder 4 via the transistors 16-0 and 16-7 of the data converter 206.

An "H"-level control signal CTL turns on the transistors 17-0 and 17-7 and turns off the transistors 16-0 and 16-7 in the data converters 205 and 206. In this case, the least significant bit B0 of 8-bit data output from the ROM 2 is output to the most significant bit B7 of the instruction data bus 3 via the transistor 17-0 of the data converter 205, and output as the least significant bit B0 to the instruction decoder 4 via the transistor 17-7 of the data converter 206.

The most significant bit B7 of the 8-bit data output from the ROM 2 is output to the least significant bit B0 of the instruction data bus 3 via the transistor 17-7 of the data converter 205, and output as the most significant bit B7 to the instruction decoder 4 via the transistor 17-0 of the data converter 206.

If an address signal output from a program counter 1 is even, data output from the ROM 2 is transferred to the instruction decoder 4 without any conversion by the data converters 205 and 206. If an address signal is odd, the most and least significant bits of data output from the ROM 2 are exchanged by the data converter 205, the most and least significant bits are exchanged again by the data converter 206, and the resultant data is transferred to the instruction decoder 4. The same effects as in the first embodiment can therefore be obtained.

[Fourth Embodiment]

Figure 5:
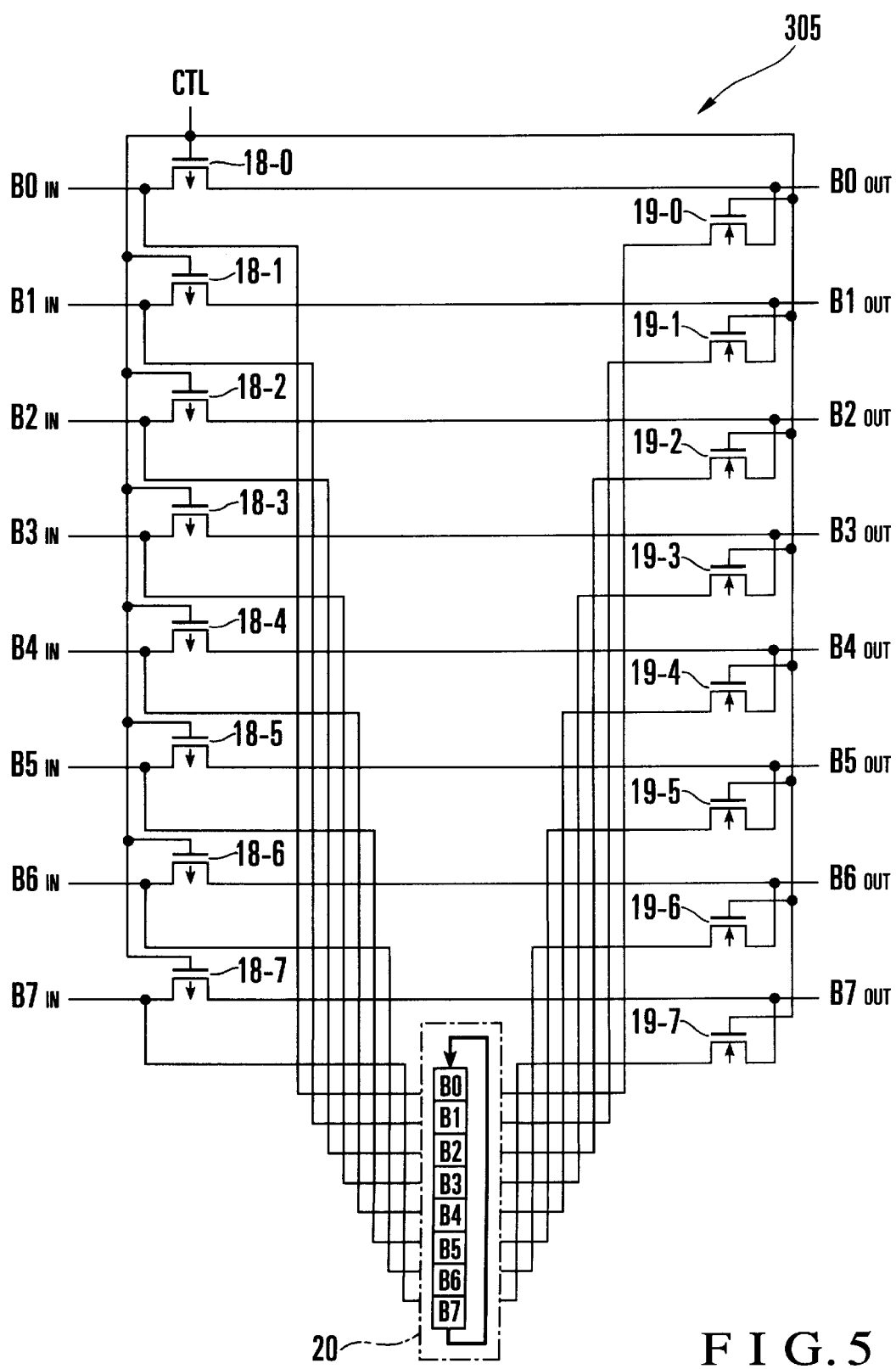
FIGS. 5 and 6 are circuit diagrams, respectively, showing the detailed arrangements of data converters according to the fourth embodiment of the present invention.
Figure 6:
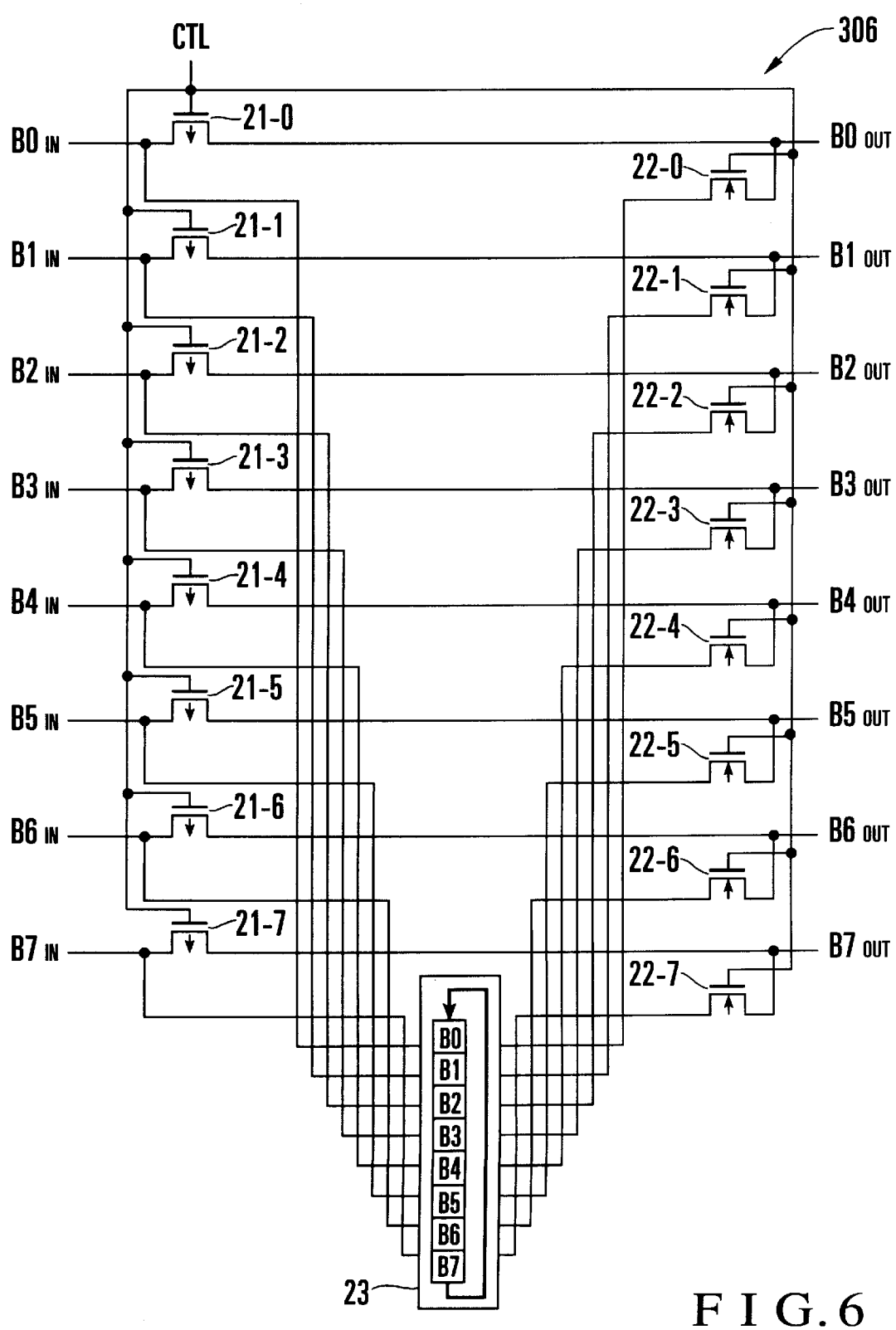
Figure 7:
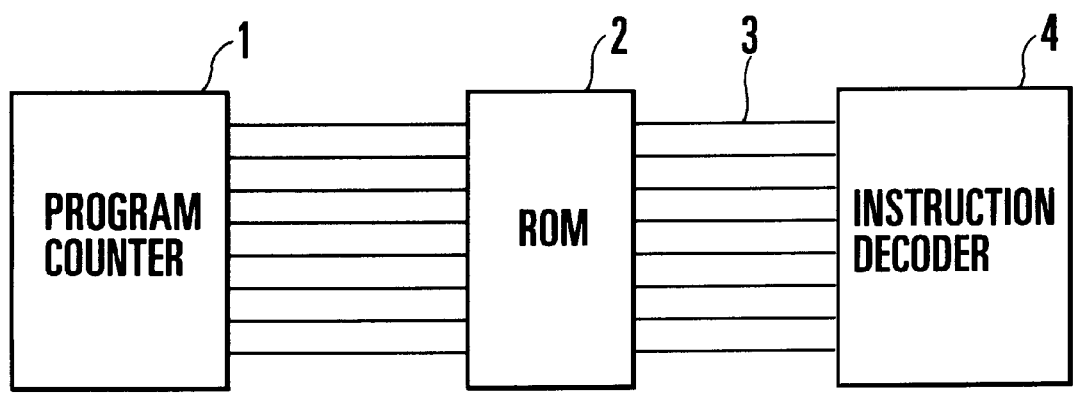
FIG. 7 is a block diagram showing the main part of a conventional microcomputer.

FIGS. 5 and 6 show a data converter according to the fourth embodiment of the present invention. A microcomputer in the fourth embodiment has almost the same arrangement as in the first embodiment. In the fourth embodiment, a data converter 305 in FIG. 5 and a data converter 306 in FIG. 6 replace the data converters 5 and 6 in FIG. 1.

In FIG. 5, the data converter 305 comprises p- and n-channel transistors 18-0 to 18-7 and 19-0 to 19-7 arranged in correspondence with the bits B0 to B7 of data output from a ROM 2, and a shift register 20 for shifting input data left by a predetermined number of bits (counterclockwise rotation).

The drains of the p-channel transistors 18-0 to 18-7 are connected to corresponding bit inputs B0IN to B7IN, the sources are connected to corresponding bit outputs B0OUT to B7OUT, and the gates receive the control signal CTL.

The parallel inputs of the shift register 20 are connected to the corresponding bit inputs B0IN to B7IN. The drains of the n-channel transistors 19-0 to 19-7 are connected to the corresponding bit parallel outputs of the shift register 20, the sources are connected to the corresponding bit outputs B0OUT to B7OUT, and the gates receive the control signal CTL.

In FIG. 6, the data converter 306 comprises p- and n-channel transistors 21-0 to 21-7 and 22-0 to 22-7 arranged in correspondence with the bits B0 to B7 of data output from the ROM 2, and a shift register 23 for shifting input data right by a predetermined number of bits (clockwise rotation).

The drains of the p-channel transistors 21-0 to 21-7 are connected to corresponding bit inputs B0IN to B7IN, the sources are connected to the corresponding bit outputs B0OUT to B7OUT, and the gates receive the control signal CTL.

The parallel inputs of the shift register 23 are connected to the corresponding bit inputs B0IN to B7IN. The drains of the n-channel transistors 22-0 to 22-7 are connected to the corresponding bit parallel outputs of the shift register 23, the sources are connected to the corresponding bit outputs B0OUT to B7OUT, and the gates receive the control signal CTL.

An "L"-level control signal CTL turns on the transistors 18-0 to 18-7 and 21-0 to 21-7 and turns off the transistors 19-0 to 19-7 and 22-0 to 22-7 in the data converters 305 and 306. In this case, the bits B0 to B7 of 8-bit data output from the ROM 2 are output to an instruction data bus 3 via the corresponding transistors 18-0 to 18-7 of the data converter 305, and output to an instruction decoder 4 via the corresponding transistors 21-0 to 21-7 of the data converter 306.

An "H"-level control signal CTL turns on the transistors 19-0 to 19-7 and 22-0 to 22-7 and turns off the transistors 18-0 to 18-7 and 21-0 to 21-7 in the data converters 305 and 306. In this case, the bits B0 to B7 of 8-bit data output from the ROM 2 are rotated counterclockwise by a predetermined number of bits by the shift register 20 of the data converter 305, and output to the instruction data bus 3 via the corresponding transistors 19-0 to 19-7. Subsequently, the bits B0 to B7 are rotated clockwise by a predetermined number of bits by the shift register 23 of the data converter 306, and output to the instruction decoder 4 via the corresponding transistors 22-0 to 22-7.

In this way, if an address signal output from a program counter 1 is even, data output from the ROM 2 is transferred to the instruction decoder 4 without any conversion by the data converters 305 and 306. If an address signal is odd, data output from the ROM 2 is rotated counterclockwise by the data converter 305, the shifted data is rotated clockwise to the original data by the data converter 306, and the resultant data is transferred to the instruction decoder 4.

Accordingly, the same effects as in the first embodiment can be obtained. Note that data may be rotated clockwise by the data converter 305 and counterclockwise by the data converter 306.

In the above-described first to fourth embodiments, data is converted when an address signal output from the program counter 1 is odd, but may be converted when an address signal is even. In this case, when an address signal is even, the control signal CTL is set to "H" level, or p- and n-channel transistors are exchanged.

In the first to fourth embodiments, the controller 7 converts data when an address signal output from the program counter 1 is odd, but may instruct data conversion to the data converters 5, 6, 105, 106, 205, 206, 305, and 306 upon reception of a specific instruction A shown in FIG. 1 from a CPU (Central Processing Unit; not shown) or the like. The specific instruction A may be output at a definite or indefinite period. In addition, the controller 7 may adopt both data conversion based on an address signal and data conversion based on an instruction from the CPU.

In the first to fourth embodiments, the present invention is applied to data transfer between the ROM 2 and instruction decoder 4. However, the present invention is not limited to this and may be applied to another data transfer system. Further, the number of bits of transfer data is not limited to eight.

As has been described above, according to the present invention, data output from the first circuit is converted by the first data converter and output to the data bus, and the data transferred through the data bus is converted back to the original data by the second converter. Data flowing through the data bus can be different from the original data, and the data becomes difficult to illicitly obtain. As a result, a security function with respect to an illicit data read on the data bus line can be realized.

The microcomputer comprises the controller for determining based on an address signal for reading data from the first circuit whether input data is converted by the first and second data converters or directly output. Data is or is not converted in accordance with an address signal to further improve the security function.

Moreover, the microcomputer comprises the controller for determining based on an external instruction whether input data is converted by the first and second data converters or directly output. Data is or is not converted in accordance with an instruction to further improve the security function.

What is claimed is:

1. A semiconductor integrated circuit for a semiconductor integrated circuit, comprising:

a first circuit for outputting data of a plurality of bits;

a second circuit for receiving the data from said first circuit via a data bus;

first data conversion means for converting the data from said first circuit by a first conversion rule and outputting the data to the data bus; and second data conversion means for converting the data from the data bus back to original data by a second conversion rule and outputting the data to said second circuit.

2. A circuit according to claim 1, further comprising control means for controlling data conversion operation of said first and second data conversion means, wherein said first circuit is a memory for storing data in accordance with an address and said controlling means controls said first and second data conversion means on the basis of an address signal for reading out data from said memory.

3. A circuit according to claim 2, wherein said control means controls an ON/OFF state of data conversion operation of said first and second data conversion means on the basis of an odd/even address signal supplied to said memory.

4. A circuit according to claim 2, wherein said transfer circuit further comprises a program counter which is incremented to sequentially supply address signals to the memory, and said second circuit is an instruction decoder for decoding data read out from the memory.

5. A circuit according to claim 1, further comprising control means for controlling data conversion operation of said first and second data conversion means on the basis of an external instruction.

6. A circuit according to claim 1, wherein said first and second data conversion means invert a logic level of a bit signal constituting data as the first and second conversion rules.

7. A circuit according to claim 1, wherein data is made up of at least two, upper and lower bit signals, and said first and second data conversion means exchange upper n (n is a positive integer) bit signals and lower n bit signals as the first and second conversion rules.

8. A circuit according to claim 7, wherein data is made up of pluralities of upper and lower bit signals, and said first and second data conversion means exchange the plurality of upper bit signals and the plurality of lower bit signals as the first and second conversion rules.

9. A circuit according to claim 7, wherein data is made up of a plurality of bit signals, and said first and second data conversion means exchange the most and least significant bits as the first and second conversion rules.

10. A circuit according to claim 1, wherein data is made up of a plurality of bit signals, said first data conversion means performs one of clockwise and counterclockwise rotation operations for each bit signal as the first conversion rule, and said second data conversion means performs the other one of clockwise and counterclockwise rotation operations as the second conversion rule.

11. A semiconductor integrated circuit for a semiconductor integrated circuit, comprising:

a first circuit for outputting data of a plurality of bits;

a second circuit for receiving the data from said first circuit via a data bus;

first data conversion means for converting the data from said first circuit by a first conversion rule and outputting the data to the data bus;

second data conversion means for converting the data from the data bus back to original data by a second conversion rule and outputting the data to said second circuit; and control means for controlling data conversion operation of said first and second data conversion means, wherein said first circuit is a memory for storing data in accordance with an address, and said controlling means controls said first and second data conversion means on the basis of an address signal for reading out data from said memory, and wherein said control means controls an ON/OFF state of data conversion operation of said first and second data conversion means on the basis of an odd/even address signal supplied to said memory.

* * * * *